May 19, 1970

R. M. HOWE 3,513,301

ELECTRONIC FUNCTION GENERATION

Filed Oct. 26, 1967

INVENTOR.
ROBERT M. HOWE

BY *Richard L. Stephens*

ATTORNEY

May 19, 1970 R. M. HOWE 3,513,301
ELECTRONIC FUNCTION GENERATION
Filed Oct. 26, 1967 7 Sheets-Sheet 3

INVENTOR.
ROBERT M. HOWE
BY Richard H. Stephens
ATTORNEY

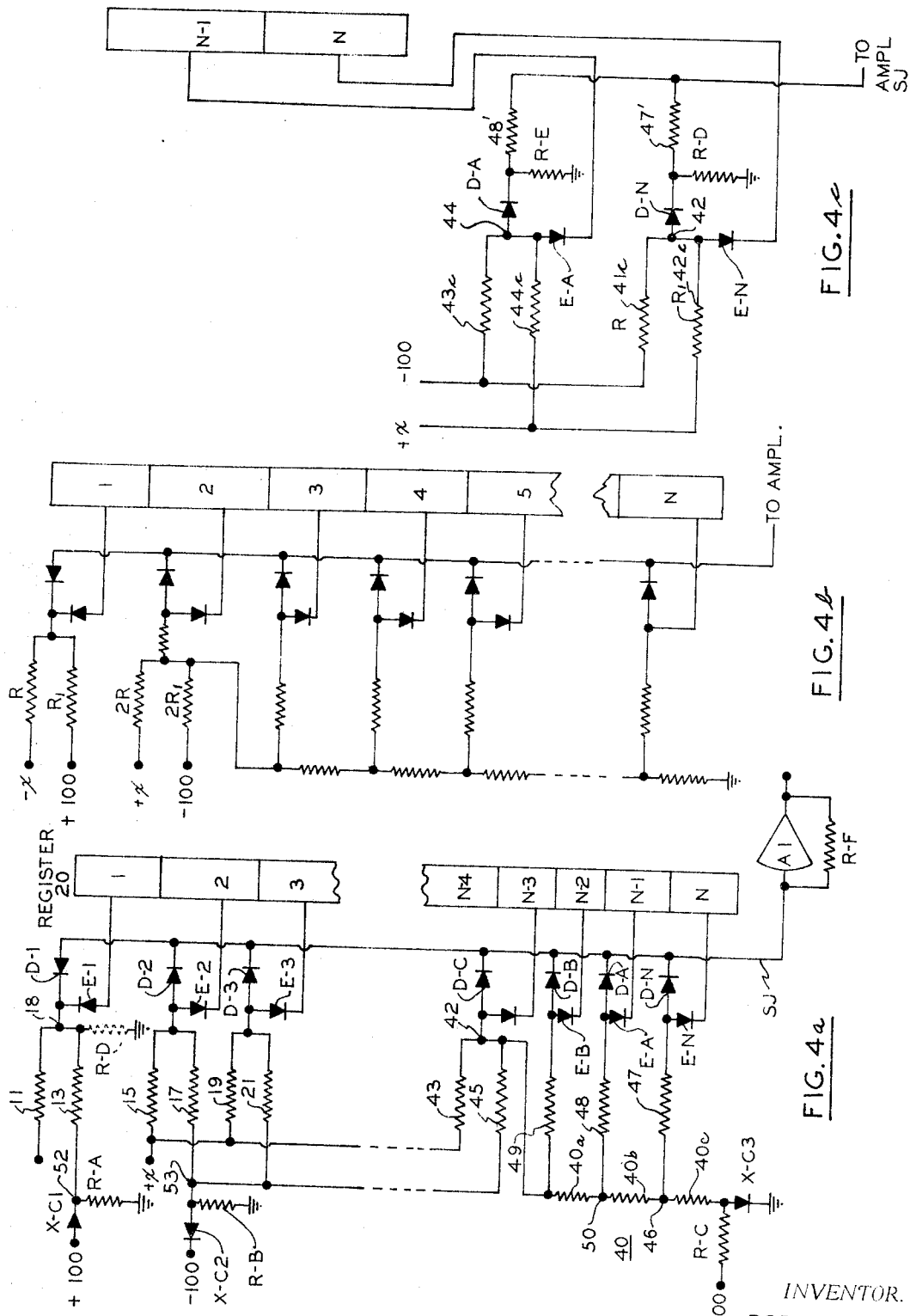

United States Patent Office 3,513,301
Patented May 19, 1970

3,513,301
ELECTRONIC FUNCTION GENERATION
Robert M. Howe, Ann Arbor, Mich., assignor to Reliance
Electric Company, a corporation of Delaware
Filed Oct. 26, 1967, Ser. No. 678,411
Int. Cl. G06g 7/26
U.S. Cl. 235—150.53   33 Claims

ABSTRACT OF THE DISCLOSURE

Electronic arbitrary function generators using biased diodes which derive and sum currents weighted in accordance with a digital code to provide slope incremental functions, with compensation for diode temperature coefficient, simple and rapid set-up, with applicability to multiplying function generation, function generation at arbitrarily-spaced breakpoint values and multi-variable function generation. This invention relates to electronic analog function generation, and more particularly to means for generating arbitrary non-linear functions of one or more analog input voltages at low cost with high precision and bandwidth, using automatic means, such as a digital computer or card reader, for converting stored data points into digital signals to produce a desired function. The invention is applicable to both single independent variable and multivariable function generation.

In the computer, automatic control, simulation and instrumentation arts, a wide variety of applications require that voltages be generated as functions of one or more independent variables. The most commonly used device for analog function generation, at least in recent years, has been the diode function generator. In the most common form of such a device a function $f(x)$ is approximated using a finite number of straight-line segments, by summing together in an operational amplifier, a parallax or bias current $f_0$, a linear central-slope current $f_x(x)$, and a plurality of slope incremental currents $f_1$, $f_2$, $f_3$ . . . . The slope incremental functions are generated using simple biased diode networks connected to the summing junction of the operational amplifier. The breakpoint voltages $x_1$, $x_2$ . . . can be distributed on either or both sides of the origin $x=0$. A basic description of such function generators is given in Chapter 5 of my book "Design Fundamentals of Analog Computer Components" (D. Van Nostrand Company, New York, 1961). A principal shortcoming of such prior art function generators has been the time required to adjust them to provide a desired function. An N-segment function has required one adjustment for parallax, one for central slop, and $2(N-1)$ adjustments for the breakpoints and slope increments. Usually these adjustments have been accomplished with hand-set potentiometers, in an exact procedural order which has been time-consuming, and such set-up time has remained time-consuming even when the hand-set potentiometers have been replaced by servo-set potentiometers. Also, servo-set (or hand-set) diode function generators have been undesirably complex and expensive, and have tended to have poor dynamic performance due to the capacitive characteristics of the multi-turn helical potentiometers usually utilized for such function generation. In a number of hybrid (both analog and digital) computer applications it becomes either necessary or desirable to be able to set up desired functions very rapidly, in a matter of milliseconds rather than minutes.

A wide variety of schemes have been proposed to improve the function setup speed of conventional diode function generators, including means such as the storage of breakpoints and slope increments on punched cards with punched holes representing breakpoint or slope bits, and the use of removable patchboards to store the required connections to implement desired functions. Some such function generators have been undesirable in that they have required special card readers, and some have been difficult to set up accurately due to the effects of diode rounding and breakpoint interaction with slope sensitivity. Prior diode function generators using either cards or patchboard for function storage have been tedious and time-consuming to set up unless extensive digital computer programs have been available for such purposes.

A further known type of function generator is a hybrid type which employs a DAC (digital-to-analog converter) and an MDAC (multiplying digital-to-analog converter) terminated in an operational amplifier, to represent a function $f(x)$ over $n$ straight-line segments by the formula $$f(x) = a_n(x) + b_n \quad x_n \leq x \leq x_n + 1 \quad (1)$$

The slope $a_n$ and intercept $b_n$ are obtained from a digital computer, and are updated to new values every time the independent input variable $x$ passes into a new segment region. In these function generators linear interpolation is accomplished by analog means and storage is accomplished in the digital computer. A principal shortcoming of this prior art scheme is the discontinuous jump in the output function which results from any delay in updating $a_n$ and $b_n$ to new values when $x$ enters a new segment region. Variations of this scheme using sawtooth and triangular analog interpolating functions have been suggested in the prior art, as has utilization of this scheme for generating functions of two or more variables.

It is a primary object of the present invention to provide an improved electronic analog function generator at low cost, having high precision and bandwidth, which may be set by automatic means.

It is another object of the invention to provide an electronic function generator using biased diode circuits which are not adversely affected by temperature changes.

It is a further object of the invention to provide an electronic function generator which does not require a large number of precision voltage sources.

It is an additional object of the invention to provide an electronic function generator in which extremely large and extremely small resistors are not required.

Another object of the invention is to provide a multiplying function generator which will provide an output signal commensurate with the product of a first variable times an arbitrary function of a second variable.

Yet another object of the invention is to provide method and apparatus by which a desired function may be approximated at a plurality of arbitrarily-spaced breakpoint values of an input variable using a plurality of function generators each of which are individually adjustable to generate functions only at predeterminedly spaced breakpoint values.

Another object of the invention is to provide function generators of the type described which may be used to generate functions of two or more independent variables.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 3b is a graph useful in understanding the operation of the register-controlled segment generator of FIG. 3a.

FIG. 4a is an electrical schematic diagram illustrating a further form of register-controlled segment generator incorporating diode temperature compensation and illustrating several techniques which may be used to obviate the need for extreme resistor sizes.

FIG. 4b illustrates a further form of register-controlled segment generator.

FIG. 4c illustrates a portion of a still further form of register-controlled segment generator.

FIG. 7 is a schematic diagram illustrating one form of a two-variable function generator constructed in accordance with the present invention and FIG. 7a is a graph useful in explaining the operation of the device of FIG. 7.

Figure 2A:
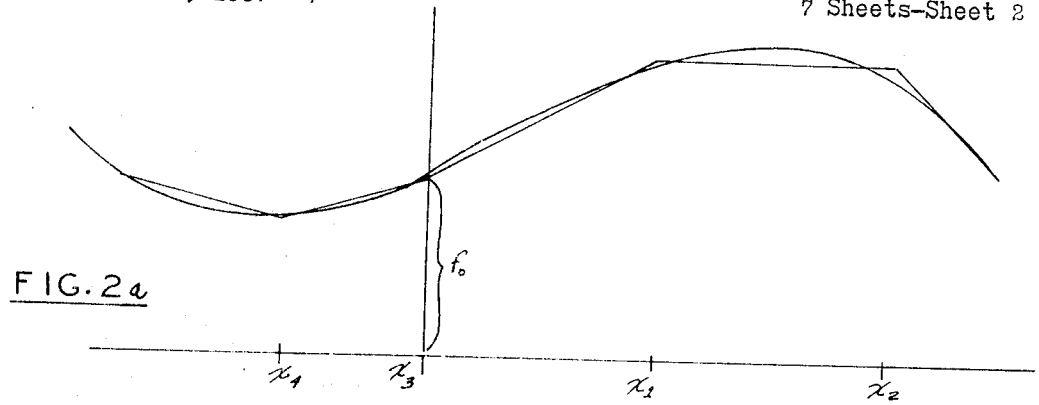
FIGS. 2a and 2b are graphs illustrating how an arbitrary function may be approximated by a plurality of straight-line segments.
Figure 2B:
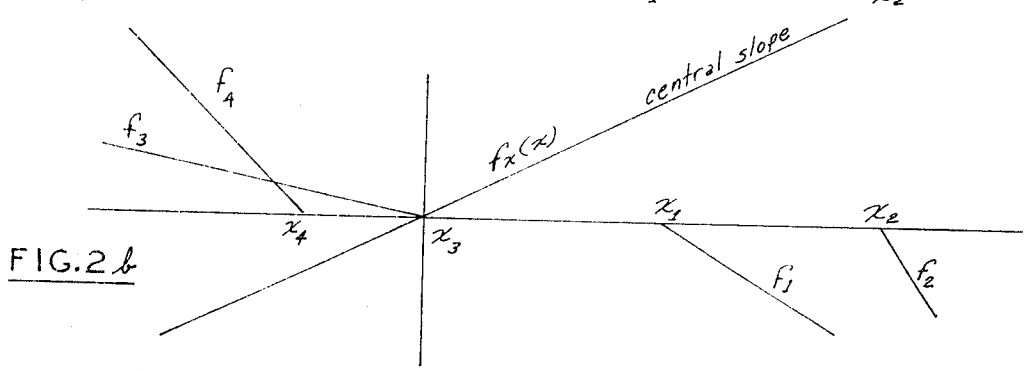
Figure 3D:
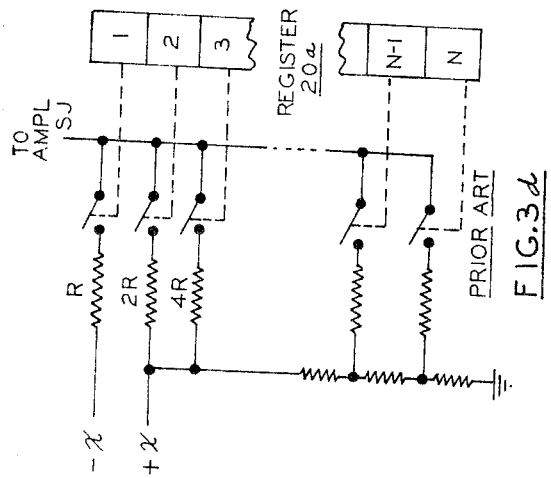
FIG. 3d is a schematic diagram of a prior art digital-to-analog converter which may be used with various embodiments of the invention.
Figure 3B:
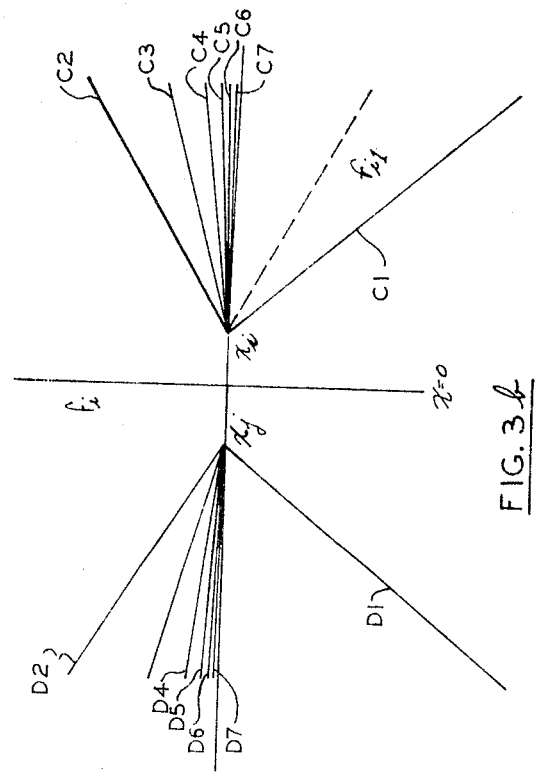

In accordance with the present invention, as well as in the prior art, a function $f(x)$ of the type shown in FIG. 2a may be approximated by summing together a parallax or bias term $f_0$, a linear central-slope term $f_x(x)$ and a plurality of slope incremental functions $f_1, f_2, f_3 \ldots f_n$. One important concept of the present invention concerns the manner in which the slope incremental functions are generated, and apparatus for generating a single slope incremental function $f_1$ is shown in FIG. 3a as comprising a group of binary-weighted resistor pairs and diode pairs which are controled by a parallel multi-bit digital input signal from register 20 to provide a desired incremental slope function. In FIG. 3b a first plurality of binary-related slope component functions C1 through C7 are shown beginning at a positive breakpoint $x_1$, and a second plurality of slope component functions D1 through D7 are all shown beginning at a negative breakpoint value $x_j$. The slopes of each group of functions C1 through C7 and D1 through D7 vary in a binary progression, and the slope of the steepest function in each of the groups is shown as being opposite in sign to the slopes of the other functions of each group. For example, if the slope of C1 is 6.4, those of C2, C3 ... C7 will be 3.2, 1.6, 0.8, 0.4, 0.2 and 0.1, respectively, with the C1 slope negative and those of C2 through C7 positive. A given incremental slope function $f_1$ is generated by the apparatus of FIG. 3a by selectively combining slope component functions in accordance with the contents of register 20. For example, slope component functions C1, C2 and C5 may be added when there are "1" bits in stages 1, 2 and 5 or register 20 to provide incremental slope function of $f_{11}$ shown in dashed form. It may be seen that by adding together different combinations of the slope component functions any slope incremental function from zero to a maximum may be obtained. In FIG. 3b it will be seen that a maximum negative slope will be obtained by generation of function C1 alone, while a maximum positive slope would be obtained by adding together all of functions C2 through C7. In various applications where the desired functions are alawys of one polarity, it will be apparent that the apparatus (resistors 11 and 13 and diodes D-1 and E-1 in FIG. 3a) for generating the C1 function may be eliminated.

In FIG. 3a a current which varies in accordance with each one of functions C1 through C7 is generated by a respective pair of resistors and a first unidirectional-conducting device or diode, and switched or not switched to the summing junction of operational amplifier A1 by a second diode in accordance with the state of a respective bit in register 20. Positive and negative input voltages commensurate with the independent variable $x$ are applied as shown to input terminals 10 and 12, respectively, and positive and negative break-point reference voltages, such as 100 volts, for example, are applied to input terminals 14 and 16, respectively. Resistors 11 and 13 and diode D-1 generate the C1 function, and stage 1 which carries the most significant bit (MSB) in register 20 controls diode E-1 to connect or not connect a current to summing junction SJ. Similarly, resistors 15 and 17 and diodes D-2 and E-2 generate a current corresponding to the C2 function and selectively apply it to amplifier A1 in accordance with the next most significant bit (MSB-1) in stage 2 of register 20, and further slope component functions are similarly generated and switched by further resistor and diode pairs. Resistors 23 and 25 and diodes D-N and E-N are associated with the least-significant bit in register 20. Excitation of resistors 11 and 13 with voltages opposite in polarity to those applied to the other resistor pairs, and the connection of diode D-1 to the summing junction oppositely from diodes D-2 through D-N will be seen to provide a current through diode D-1 to amplifier A1 which is opposite in polarity to those applied through diodes D-2 through D-N, thereby providing component function C1 with a slope which is opposite to those of C2, C3, C4, etc.

The C1 function current generated by resistors 11 and 13 and diode D-1 is applied to amplifier A1 by back-biasing diode E-1. Assume that a negative voltage exists in stage 1 of register 20 to reverse-bias diode E-1. The feedback current through feedback resistor R-F holds the amplifier summing junction SJ at essentially zero potential. When the value of the independent variable is either zero or negative, so that the voltage applied to terminal 12 is either zero or positive, the voltage at terminal 18 obviously will be very positive, so that diode D-1 will be back-biased and no negative current will be applied through D-1 to the amplifier. At small values of $x$ the voltage at terminal 18 will continue to back-bias diode D-1, but as $x$ increases sufficiently, the voltage at terminal 18 will eventually become negative and a negative current will be applied to the amplifier through diode D-1. The breakpoint value $x_1$ of the variable $x$ at which diode D-1 begins to conduct will be seen to occur at $100\alpha$, where $\alpha$ is the ratio between the resistances R and $R_1$ of resistors 11 and 13. When diode D-1 is conducting, the negative current applied to the summing junction through diode D-1 will be seen to equal $$\frac{x_i - x}{R}$$

Assuming instead now that stage 1 of register 20 carries a positive voltage, it will be seen that diode E-1 will conduct whenever the voltage at terminal 18 begins to go negative, so that diode D-1 will always remain cut off and no input signal will be applied to the amplifier A1 for any value of $x$.

The C2 function current derived with resistors 15 and 17 and diode D–2 is switched into amplifier A1 by reverse-biasing diode E–2, and as diode D–2 is connected oppositely from diode D–1 it will be seen that a positive voltage from stage 2 of register 20 is needed to connect the C2 function current to the amplifier, and that a negative voltage in stage 2 will result in diode D–2 always being cut off. As the independent variable $x$ increases, it will be seen that diode D–2 will conduct at the same breakpoint value $x_1$ that diode D–1 conducted, i.e. $100\alpha$, since there is the same ratio $\alpha$ between the resistances ($2R$ and $2R_1$) of resistors 15 and 17 as between those ($R$ and $R_1$) of resistors 11 and 13. When diode D–2 conducts, the positive current applied via D–2 to the amplifier will be seen to equal $$\frac{x - x_i}{2R}$$

which will be seen to provide function C2 with a slope which is one-half as great in magnitude as that of function C1 as well as being opposite in sign. The further resistor and diode pairs operate similarly to resistors 15 and 17 and diodes D–2 and E–2, each with the same breakpoint $x_1$ due to there being the same ratio $\alpha$ between the resistors of each pair, but with the less significant resistor pairs having resistances which are scaled upwardly in a binary progression as shown, to provide lesser currents to amplifier A1. With a negative current available via diode D–1 and lesser positive currents available through diodes D–2 through D–N, it will be seen that selectively applying such currents to amplifier A1 in accordance with the contents of register 20 will enable one to generate a segment $f_i(x)$ (such as $f_{11}$ in FIG. 3b) having a positive breakpoint and having a slope which may be either negative or positive. If, however, one merely interchanges the connection of the $+x$ and $-x$ input voltages to terminals 10 and 12, as by means of reversing switch S–R, one can generate similar functions having a negative breakpoint at the $x_j$ value of the variable, of the type shown at D1 through D7 in FIG. 3b, and such functions may be similarly switched into the feedback summing amplifier A1 by the contents of a register. It was shown above that the voltage required from stage 1 of register 20 must be positive to prevent current flow through diode D–1, while negative voltages are required from the other register stages in order to prevent current flow in the branch circuits which they control. It will be apparent in either case that a voltage at least slightly greater than the associated D diode contact potential (e.g. 0.7 volt with ordinary silicon junction diodes) is required. Where the stages of register 20 comprise bi-stable devices, such as flip-flops having a pair of transistors or the like, the opposite polarity voltage required from the first register stage will be readily available by merely running the stage 1 output line from the opposite one of its transistors as those from which all of the other register output lines extend. In order to allow a single segment generator such as that shown in FIG. 3a to be used for both positive and negative breakpoint operation, the $+x$ and $-x$ voltages may be applied to terminals 10 and 12 through a reversing switch, such as that shown in FIG. 3a at S–R.

Figure 3C:
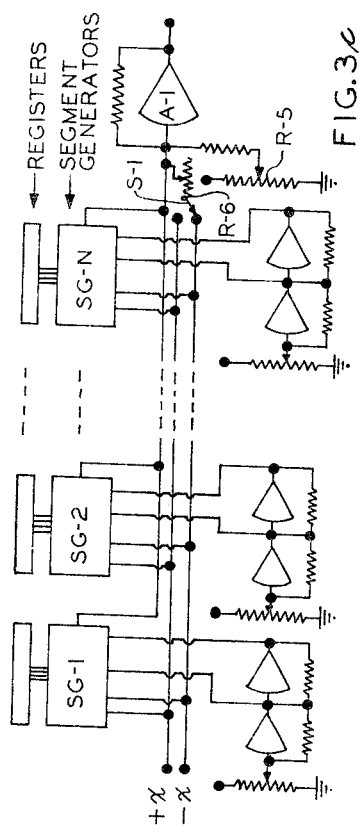
FIG. 3c is an electrical schematic diagram illustrating one manner in which a plurality of register-controlled segment generators may be combined to generate a function over a plurality of segments.
Figure 3A:
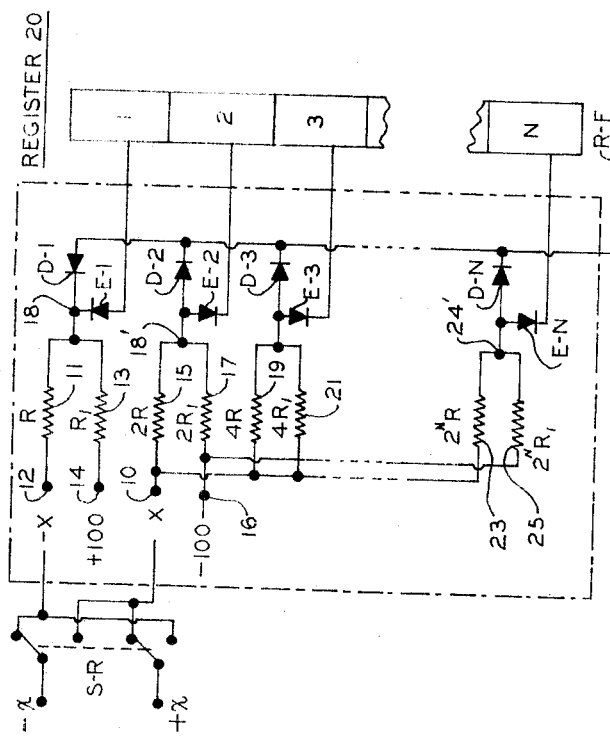
FIG. 3a is an electrical schematic diagram illustrating one form of a register-controlled segment generator constructed in accordance with the invention.

In order to generate a complete function, a plurality of segment generators of the type shown within dashed lines in FIG. 3a are controlled by respective registers and all of their outputs may be connected to the same amplifier, as shown in FIG. 3c. In order to operate at different breakpoints, successive segment generators either must incorporate different sets of resistors, or they all may be identical if different sets of + and − reference voltages are applied to them. If the values of resistances $R$ and $R_1$ of resistors 11 and 13 are 10K ohms and 100K ohms, respectively, the breakpoint of the circuit of FIG. 3a will be established at approximately 10 volts. The corresponding $R$ and $R_1$ values of further segment generators could be made 10K and 50K, 10K and 33.3K, 10K and 25K, 10K and 20K, 10K and 16.7K, 10K and 14.3K, 10K and 12.5K, and 10K and 11.1K, thereby establishing their breakpoints at 20, 30, 40, 50, 60, 70, 80 and 90 volts, with a single set of + and 100-volt reference sources used to supply all nine segment generators. A novel manner in which two such function generators having a uniform or predetermined breakpoint spacing may be interconnected to generate desired functions at arbitrarily-spaced breakpoints is disclosed below in connection with FIG. 6.

Alternatively, a single set of $R$ and $R_1$ values (e.g. 10K and 10K) may be used for all nine segment generators, with different + and − reference voltage pairs supplied to each segment generator. For example, using 10K ohms for all $R$ and $R_1$ resistances, segment 1 could be supplied with plus and minus 10-volt reference voltages on its terminals 14 and 16 to establish its breakpoint at 10 volts, segment 2 could be supplied with plus and minus 20-volt reference voltages to establish its breakpoint at 20 volts, etc., with the ninth segment generator requiring + and 90-volt reference voltages to establish its breakpoint at 90 volts. Or, as another example, all $R$ and $R_1$ resistances could be made 10K and 11.1K, with the segment 1 generator supplied with plus and minus 11.1 volt references to establish its breakpoint at 10 volts, the segment 2 generator supplied with plus and minus 22.2-volt references to establish its breakpoint at 20 volts, etc., with the ninth segment being supplied with plus and minus 100 volts to establish its breakpoint at 90 volts. As a further alternative, a function generator may incorporate both alternative techniques, with some segments having identical resistors and different reference voltages, while other segments use a common pair of reference voltages and respective different sets of $R$ and $R_1$ resistance values. In FIG. 3c each segment generator is assumed to have the same set of resistances and hence each generator requires a different set of positive and negative breakpoint reference voltages. In FIG. 3c such voltages are shown being derived by respective potentiometers and inverting amplifiers, thereby allowing the breakpoints to be adjusted by adjustment of the potentiometers. In many (but not all) applications, the function desired may not be zero at the zero value of the independent variable, so that a parallax or bias input may be required. In FIG. 3c a bias input is shown being applied to amplifier A1 from potentiometer R–5. However, the parallax term may be generated instead by use of a further segment generator of the type shown in FIG. 3a, with the $+x$ and $-x$ input terminals 10 and 12 of the further segment generator connected to the reference voltages and with the breakpoint input terminals 14 and 16 both connected to zero voltage, which will allow the parallax term to be set by a further register connected to control the further segment generator. In order to provide a central-slope term, one polarity or the other of the $x$ input voltage may be applied to the amplifier via switch S–1 and potentiometer R–6. If one desires to also set the central-slope from a digital register instead of from potentiometer R–6, one may utilize instead any one of a number of known forms of MDAC (multiplying digital-to-analog converter). In FIG. 3d one suitable MDAC is shown as comprising a plurality of switches which are selectively closed by the contents of register 20a. The switches are shown for simplicity as simple mechanical switches but in most applications would comprise electronic switches, such as field-effect transistor (FET) switches. If only fixed breakpoint operation is desired it will be apparent that the breakpoint reference voltage pairs may be derived from various other voltage sources instead of from the potentiometer-amplifier pairs shown in FIG. 3c.

FIG. 4a illustrates several modifications which may be made to the segment generator of FIG. 3a. With the resistances of the resistor pairs in FIG. 3a increasing in a binary progression it will be seen that the resistances required for the less significant bits may become extremely large if a large number of bits are used, or else the resistances associated with the most significant digits would have to be made undesirably low, so that the segment generator input impedance would be undesirably low. To obviate such a problem, one or more of the less significant bit currents may be provided by means of a voltage divider arrangement of the type shown at 40 in FIG. 4a. It will be recalled from the description of FIG. 3a that junction point 18 between resistors 11 and 13 began to swing negative at the breakpoint value $x_1$ of the variable, and that the junction points between resistor pairs 15, 17 and 19, 21 and 25 began to swing positive at the same breakpoint value, and hence it should be appreciated that junction point 42 between resistors 43 and 45 will similarly begin to swing positive in FIG. 4a as the $x$ input exceeds $100\alpha$. Junction point 42 is connected to drive voltage divider 40, which comprises resistors 40a, 40b and 40c, through a diode X–C3, the effect of which diode may be ignored for the moment. Each tap on the voltage divider is connected through a scaling resistance and a first diode to the summing junction, and a second diode controlled by a register bit is connected to the junction between its associated scaling resistor and first diode. For example, the lowest tap 46 of the voltage divider is connected through scaling resistance 47 and diode D–N to the summing junction, and diode E–N connected between the least significant bit of register 20 and the junction between resistor 47 and diode D–N. The current applied to the summing junction via diode D–N will be seen to be directly proportional to the resistance of tap 46 to ground and inversely proportional to the resistance of scaling resistor 47. If resistor 40c has a value $r$, resistor 40b a value $r$, and resistor 40a a value of $2r$, and if scaling resistors 47, 48 and 49 all have the same resistance, it will be seen that currents appropriately scaled in a binary fashion will be applied through the scaling resistors to the summing junction when the voltage at terminal 42 is at some positive value (assuming, of course, that the three least significant bits of the register cut off their associated diodes, E–N, E–A and E–B).

Rather than providing a voltage divider with taps arranged at binary related impedance-to-ground locations and using scaling resistors which are all the same, the necessary binary relationship between the currents provided by the least significant stages may be effected in part or entirely by the relationship between the scaling resistors, such as the resistors 47–49. For example, where the resistances of resistors 40a, 40b and 40c are $2r$, $r$ and $r$ as before, resistor 47 could be connected to tap 50 instead of to tap 46 if resistor 47 has twice the resistance of resistors 48 and 49. Or instead, all three of the scaling resistors 47–49 could be connected to the same tap if their resistances were related in a binary manner. While FIG. 4a illustrates a segment generator in which three least significant currents are generated with a voltage divider, the number of the less significant currents which are so generated will vary in different applications from one to more than three, of course, depending upon the cost and availability of large resistors and the desired input impedance of the segment generators. A limiting example is shown in FIG. 4b in which all of the positive currents except the first are generated from voltage-divider taps. A large number of binary-related taps on a voltage divider will be seen itself to undesirably require extremely large resistances, and hence where most of the currents are derived from a voltage divider it will be dedesirable in most applications to provide differing scaling resistances.

A further alternative technique for avoiding the use of extremely large resistances for the least significant bits is illustrated in FIG. 4c. The ratio between resistances 41c and 42c will be seen to correspond to that of resistances 23 and 25 in FIG. 3a but with much smaller (one-$n$th) resistances used, and instead of being connected directly to the summing junction diode D–N is connected across a relatively low resistance R–D to ground, and through a relatively high scaling resistance 47' to the amplifier summing junction, so that only a small fraction of the current through D–N flows to the summing junction. If the ratio between the resistances of resistor 47' and R–D is 1000, for example, the ratio between the corresponding resistances (48' and R–E) of the next most significant bit may be made 500, etc. It should be emphasized that a function generator may utilize a combination of several of the techniques described in connection with FIGS. 4a and 4c in order to avoid a requirement for extremely large resistances.

Returning to FIG. 4a, it will be seen that the $+100$-volt reference potential is connected to resistor 13 through forward-biased diode X–C1 and that the junction point 52 between diode X–C1 and resistor 13 is connected to ground through resistor R–A, thereby making the voltage at point 52 equal to $+100-e_d$, where $e_d$ is the diode X–C1 forward voltage drop due to the currents through resistor R–A and resistor 13. As temperature increases, $e_d$ will decrease (with ordinary silicon-junction diodes), thereby slightly increasing the voltage at point 52 in a positive direction, which will tend to compensate for the similar decrease in voltage drop across diode D–1 due to the increased temperature, and thereby tend to maintain the diode D–1 current at the same value for a given value of the independent variable as temperature changes. Resistance R–A may comprise an adjustable resistance, of course. If the resistance R of resistor 11 is made approximately equal to the resistance $R_1$ of resistor 13, a second diode (not shown) may have to be inserted in series with diode X–C1 to obtain complete temperature compensation. If resistors 11 and 13 are equal, it will be seen that one-half of the rise in voltage at terminal 52 due to temperature change will appear at terminal 18, and use of two diodes in series can provide an increase in voltage at terminal 18 which exactly cancels the decreased drop through diode D–1. Diode X–C2 and resistor R–B operate similarly but with an opposite polarity to cancel out the effect of temperature on diode D–2 and D–3. As temperature increases, the decreased drop across diode X–C2 makes the bias-input voltage to resistors 17 and 21 slightly more negative, thereby compensating for the decreased drops across diodes D–2 and D–3. Two diodes may be used in series at X–C2 for the reasons discussed above, where resistances 15 and 17 are of approximately equal size. If desired, a resistor R–D (shown in dashed lines) may be connected from terminal 18 to ground. If the resistance of resistors 13 and R–D in parallel equal that of resistor 11, it will be seen that the use of two diodes in series at X–C1 will give exact temperature compensation, assuming, of course, that the diodes have identical temperature characteristics. With a single diode at X–C1, it will be seen that the compensation is at best only approximate when the resistance of resistor 13 is large compared to that of resistor 11.

A temperature-compensating means for the voltage divider 40 circuit is shown in FIG. 4a as comprising diode X–C3 and resistor R–C. The current through diode X–C3 from voltage divider 40 and resistor R–C will be seen to provide a decreased voltage drop across diode X–C3 as temperature increases, thereby lowering the voltage at each tap of the voltage divider by the same amount, in a negative direction, and thereby compensating for the decreased voltage drops across diode D–N and diodes D–A, D–B and D–C. It will be apparent that resistances R–A and R–B could be connected to reference potentials other than ground, if desired, and that resistance R–C could be connected to a reference potential other than $+100$ volts, but with no apparent advantage over the connections shown in FIG. 4a. It should be noted that terminals 52 and 53 in FIG. 4a may be connected to drive a plurality of further segment generators, so that a single set of X–C2, R–B and X–C3, R–C circuits may provide temperature compensation for a complete multi-segment function generator.

Figures 1, 6A:
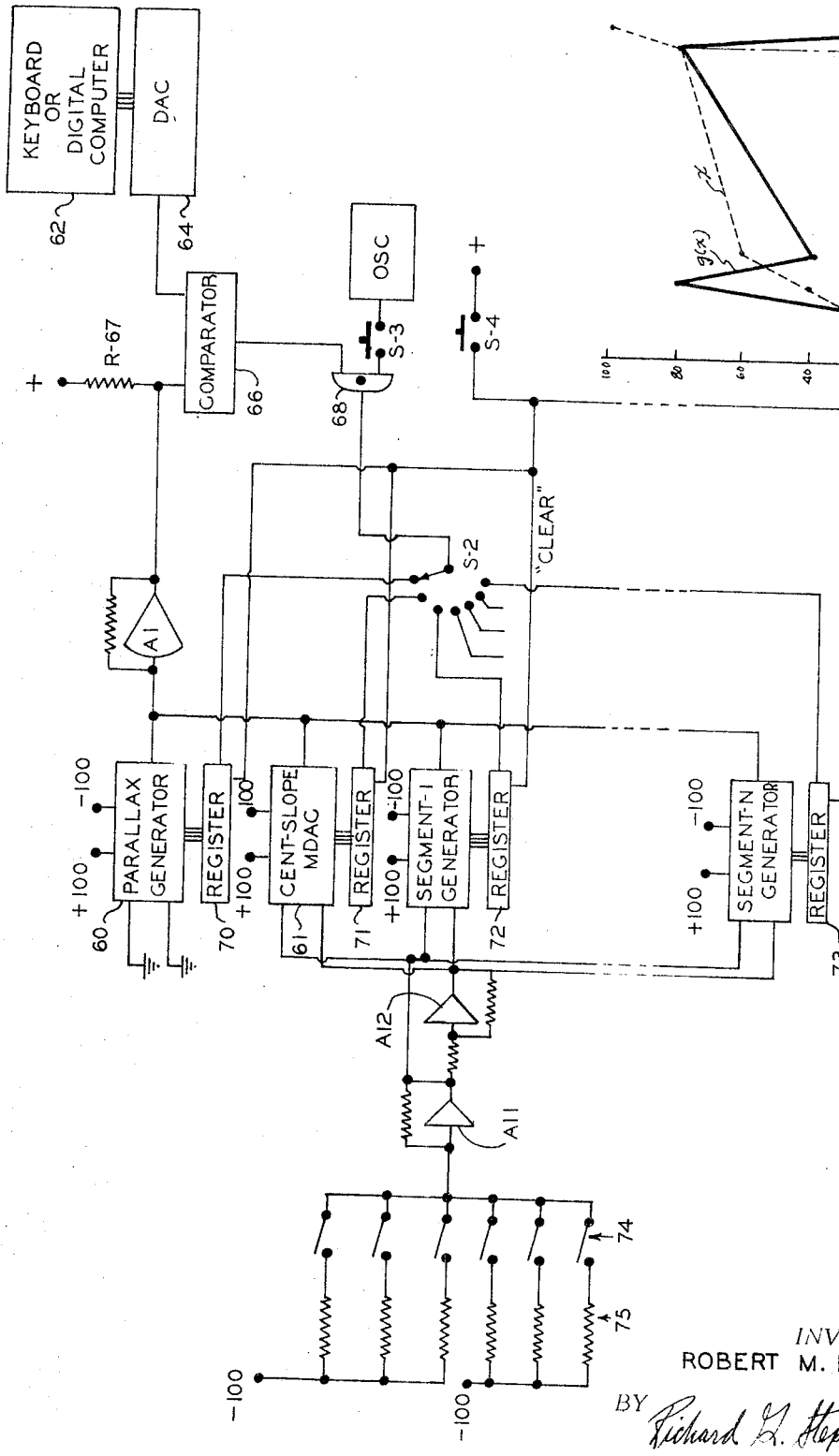
FIG. 1 is a schematic diagram, largely in block form, illustrating one form of single-variable function generator constructed in accordance with the invention, together with apparatus which may be used to adjust the function generator to provide a desired function.
FIG. 6a is a graph in explaining the operation of the circuit of FIG. 6.

An important feature of the present invention is the ease and rapidity with which desired functions may be set up, either manually or from a digital computer. In the embodiment of the invention shown in FIG. 1, parallax generator 60, and each of N segment generators numbered 1 through N may comprise current generators of the type shown in FIG. 3a (preferably incorporating the voltage-divider and temperature compensation techniques explained in connection with FIG. 4a and/or FIG. 4c), and central-slope MDAC 61 may comprise an MDAC of the type shown in FIG. 4b. In FIG. 1 means for deriving positive and negative pairs of breakpoint voltages are shown as comprising a pair of operational amplifiers A11 and A12, from which desired breakpoint voltages are derived by selective closure of various ones of a plurality of switches of the group 74, each of which switches is connected through a respective scaling resistance to a reference voltage supply. The switches of group 74 and scaling resistances of group 75, only a few of which are shown, may be arranged either so that closure of a single switch provides a predetermined pair of breakpoint value voltages from amplifiers A11 and A12, or in binary or BCD fashion, for example, so that selective closure of groups of the switches of group 74 provide desired breakpoint value pairs from amplifiers A11 and A12.

Each of the registers shown in FIG. 1 preferably comprises a binary counter. (If desired, a single binary counter may be connected successively to separate registers to set independent flip-flops comprising the registers.) An input device 62 such as a keyboard or a digital computer is arranged to apply a digital input signal to a conventional digital-to-analog converter 64. When DAC64 is connected to a digital computer using pure binary arithmetic, DAC64 may comprise the device of the type shown in FIG. 3d, for example, with constant reference voltages substituted for the $+$ and $-x$ input voltages shown in FIG. 3d. Where a manual keyboard input device is used, it preferably will comprise a decimal keyboard and include a decimal-to-binary converter (not shown), or a decimal-to-binary coded decimal converter, and DAC64 be arranged to convert the keyboard entry in either case to an analog voltage. The DAC64 output and the amplifier A1 output are shown connected to an electronic comparator 66, which compares its two input voltages and provides either a logic "1" or a logic "0" output signal, depending upon which of the two inputs is greater, i.e. the polarity of the sum of the two inputs.

To set up a function on the device of FIG. 1, switch S–4 is first momentarily closed to apply a "clear" pulse to reset all of the register-counters to their negative limit values, so as to provide maximum negative current from each current generator. If all registers are cleared to a "reset" condition in all bit stages, their most-significant current-generators will be enabled and all of their less-significant current generators will be turned off, since, as mentioned above, the register output applied to the E–1 diode of each segment generator is connected oppositely from the other stages of the same register. Selector switch S–2 is positioned to the position shown in FIG. 1, and all of the switches of group 74 are opened, so that no output voltages are provided from MDAC61 or any of the segment generators. A keyboard or computer entry corresponding to the parallax value (i.e. the value of the function at $x=x_0$) is entered into DAC64. With a negative output voltage from amplifier A1 due to the limit value set in counter-register 70, and a relatively positive DAC64 output voltage applied to comparator 66, the comparator provides a logic "1" output signal, which is connected to enable AND gate 68. Upon closure of switch S–3, pulses from oscillator OSC are applied via AND gate 68 and selector switch S–2 to the limit input line at the least-significant stage of counter register 70 associated with parallax generator 60, thereby increasing the count in register 70, so that the parallax generator 60 output current to amplifier A1 causes a positively increasing output voltage from amplifier A1. When the amplifier output voltage reaches the DAC output voltage representing the desired parallax term, the switching of comparator 66 disables AND gate 68, leaving a count in counter 70 which will provide the desired parallax value. To prevent the count from proceeding one count too far before AND gate 68 is disabled, a small bias current equal to one-half the current provided by the least-significant bit of each segment generator may be applied to comparator 66, as is represented by resistor R–67 in FIG. 1.

Next, various switches of group 74 are selectively closed to provide voltages corresponding to the first breakpoint value from amplifiers A11 and A12, a keyboard entry is made corresponding to the value of the function at the first breakpoint $x_1$, and switch S–2 moved to connect the AND gate 68 output line to the input of counter-register 71 associated with MDAC61. Then closure of switch S–3 gates pulses to set register 71 in a similar manner.

Next, various switches of group 76 are closed to provide the breakpoint output voltages from amplifiers A11 and A12, switch S–2 advanced to connect AND gate 68 to the segment 1 generator register 72, a keyboard entry made in accordance with the value of the function at the second breakpoint, and then switch S–3 closed until pulses from the oscillator have filled register 72 to the proper value, as indicated by the switching of comparator 66. Then switches of group 74 are closed to provide voltages corresponding to the next breakpoint from amplifiers A11 and A12, switch S–2 advanced to connect to the register to the next segment generator, a keyboard entry made, and then switch S–3 closed to allow the register to be set. Each of the succeeding segment generators are set up successively following the same procedure. It will be apparent that all of the switches shown in FIG. 1 may comprise electronic gate circuits, and that automatic operation of the switches in the mentioned sequence to set up a desired function may be accomplished very easily and in very few program steps of a digital computer.

Figure 5:
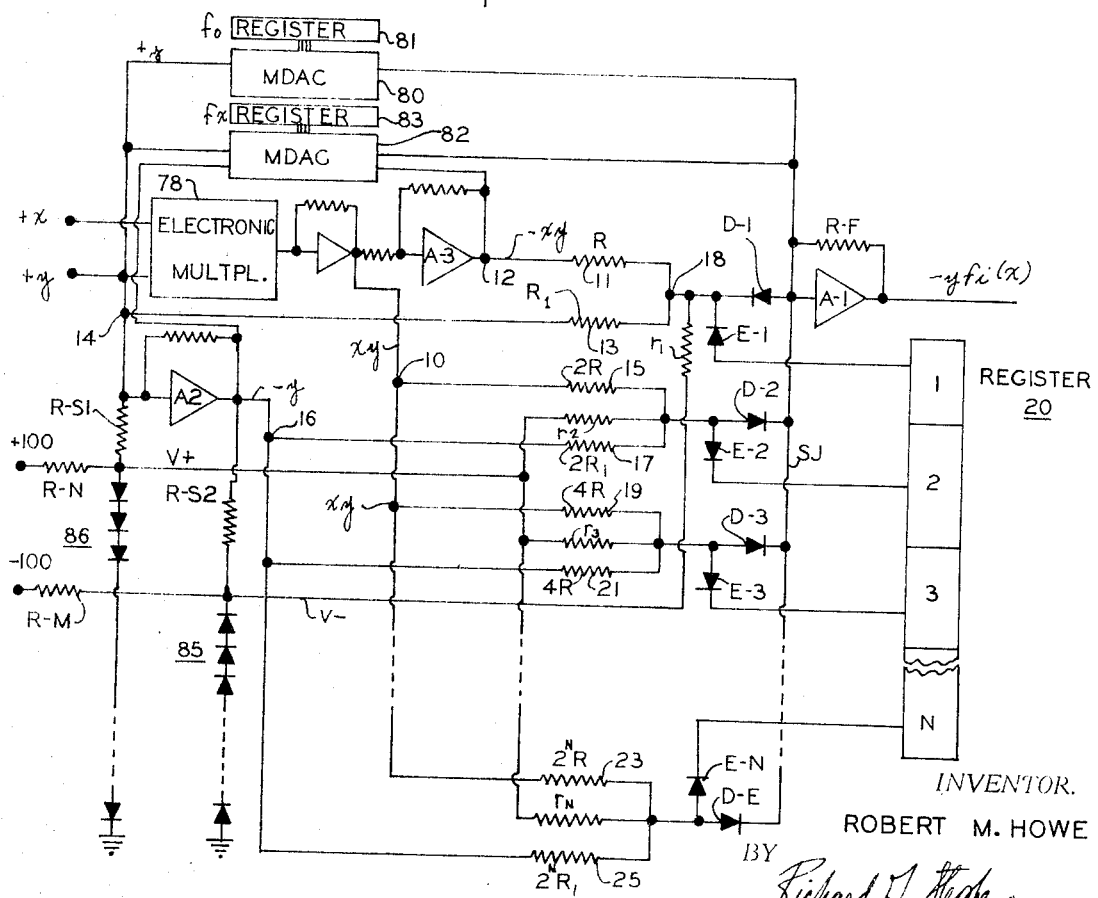
FIG. 5 is an electrical schematic diagram illustrating one form of multiplying function generator constructed in accordance with the invention.

In a wide variety of applications it is useful or necessary to generate a number of functions of a common variable $x$ all multiplied by a common variable $y$ which is either always positive or always negative. Flight equations, for example, frequently involve the derivation of many functions of Mach Number multiplied by dynamic pressure. Because electronic multipliers are expensive, it is advantageous to provide a multiplying function generator of high bandwidth which will allow any function which is generated to be multiplied by a further variable and thereby reduce the number of multipliers which generation of a given umber of $yf(x)$ products otherwise might require. Apparatus for generating a single segment of a multiplying function generator is shown in FIG. 5, together with apparatus for generating parallax and central slope currents. In order to generate a complete function multiplied by $y$, one requires a plurality of segment generators of the type shown in FIG. 5, each controlled by a respective register, plus the means for generating $yf_0$ and $xyf_x$ terms. In FIG. 5 the $yf_0$ multiplied parallax term is shown being generated by MDAC80 from the $+y$ input and the parallax value contents $(f_0)$ of register 81, and the multiplied central-slope $xyf_x$ term is shown being generated by MDAC82 from the $+y$ input and the central-slope contents $(f_x)$ of register 83. All of the further segment generators may be fed their required $+xy$ and $-xy$ inputs from terminals 10 and 12, and supplied with $+y$ and $-y$ inputs from terminals 14 and 16, and all of the currents from such further segment generators are applied to the amplifier A1 summing junction, so that no amplifiers or multipliers other than those shown in FIG. 5 are required to generate $yf_i(x)$.

In FIG. 5 parts which correspond in principle to those of FIG. 3a are given similar numerals. In FIG. 5 terminals 10 and 12 are provided with $+xy$ and $-xy$ as inputs instead of $+x$ and $-x$ as in FIG. 3a, and terminals 14 and 16 are supplied with $+y$ and $-y$ as inputs rather than the fixed reference voltages (shown as $+100$ and $-100$ volts in FIG. 3a). Since both the slope inputs to terminals 10 and 12 and the bias inputs to terminals 14 and 16 thus have been multiplied by the same factor, 6, it will be apparent that as long as $y$ remains positive, the output from amplifier A1 will be $-yf_1(x)$, instead of $-f_1(x)$ as in FIG. 3a. It should be noted that the voltages on terminals 10, 12, 14 and 16 may be routed to as many further multiplying function generators as desired, to generate further functions of $x$ multiplied by $y$. Electronic multiplier 78 preferably comprises an ordinary diode "quarter-squares" multiplier and MDAC's 80 and 82 may take the form of the device shown in FIG. 3d.

When the value of $y$ is small, it will be appreciated that the voltage at terminal 18 will always be small, so that the forward voltage drop across diode D–1 when it is conducting could be relatively large enough to contribute substantial percentage error. To compensate for the diode D–1 forward drop, a compensating potential V— is shown applied to terminal 18 via resistance $r_1$. The V— compensating potential may comprise a fixed negative potential derived as shown, from a voltage divider comprising a series-string of forwardly biased diodes shown at 85 and resistor R–S22, connected to the $-y$ input voltage. The V— potential will be seen to comprise a small negative potential which varies in magnitude in direct proportion to the $y$ input voltage. Thus at low values of $y$, a more negative potential is applied to terminal 18, thereby compensating for the forward voltage drop across diode D–1. A small V+ potential which is always positive and which varies in direct proportion to the $y$ input voltage is similarly derived by the voltage divider comprising resistor R–S1 and diode string 86, and applied via resistors $r_2, r_3 \ldots r_n$ to compensate in similar fashion for the voltage drops across diodes D–2, D–3 . . . D–N. To further compensate for diode voltage drop at low values of the $y$ input variable, the V— and V+ compensation potentials are augmented by currents shown applied via resistors R–M and R–N, respectively.

The V— and V+ voltages applied through resistances $r_1, r_2 \ldots r_n$ will also compensate for the temperature coefficiencients of diodes D–1, D–2 . . . D–N. As increased temperature causes the forward drop $e_{d1}$ of diode D–1 to decrease, it will be seen that the V— potential across diode string 85 will also decrease due to the temperature change, thereby automatically compensating for the temperature change, and the V+ potential will decrease to compensate for the decreased drops across diodes D–2 . . . D–N.

As was explained above in connection with FIG. 3c, the function generator breakpoints may be made arbitrarily variable by supplying arbitrary different reference voltage pairs to the respective segment generators. However, provision of each such pair of reference voltages ordinarily would require a pair of amplifiers, so that a large number of amplifiers would be required for generation of a function with many segments. In accordance with another feature of the present invention, the number of amplifiers required may be drastically reduced, and the overall cost of such a function generator thereby reduced.

Suppose, for example, that one wishes to generate the function $g(x)$ shown in solid lines in FIG. 6a, wherein the inflection points occur at unequally-spaced values (0, 10, 20, 30, 90, 95) of the $x$ input variable, using a function generator provided with equally-spaced breakpoint values fixed at (0, 20, 40, 60, 80, 100). In accordance with the present invention one may utilize a first function generator in the feedback path of an operational amplifier to transfrom the input variable $x$ into a comparable variable $\bar{x}$ for which the breakpoint values are equally spaced, and then utilize a second function generator having predetermined uniformly-spaced breakpoint circuitry driven by the $\bar{x}$ variable to generate the desired function $g(x)$. In FIG. 6a the unequally-spaced $x$ breakpoints are shown plotted against equally-spaced $\bar{x}$ breakpoints by the dashed curve.

Figure 6:
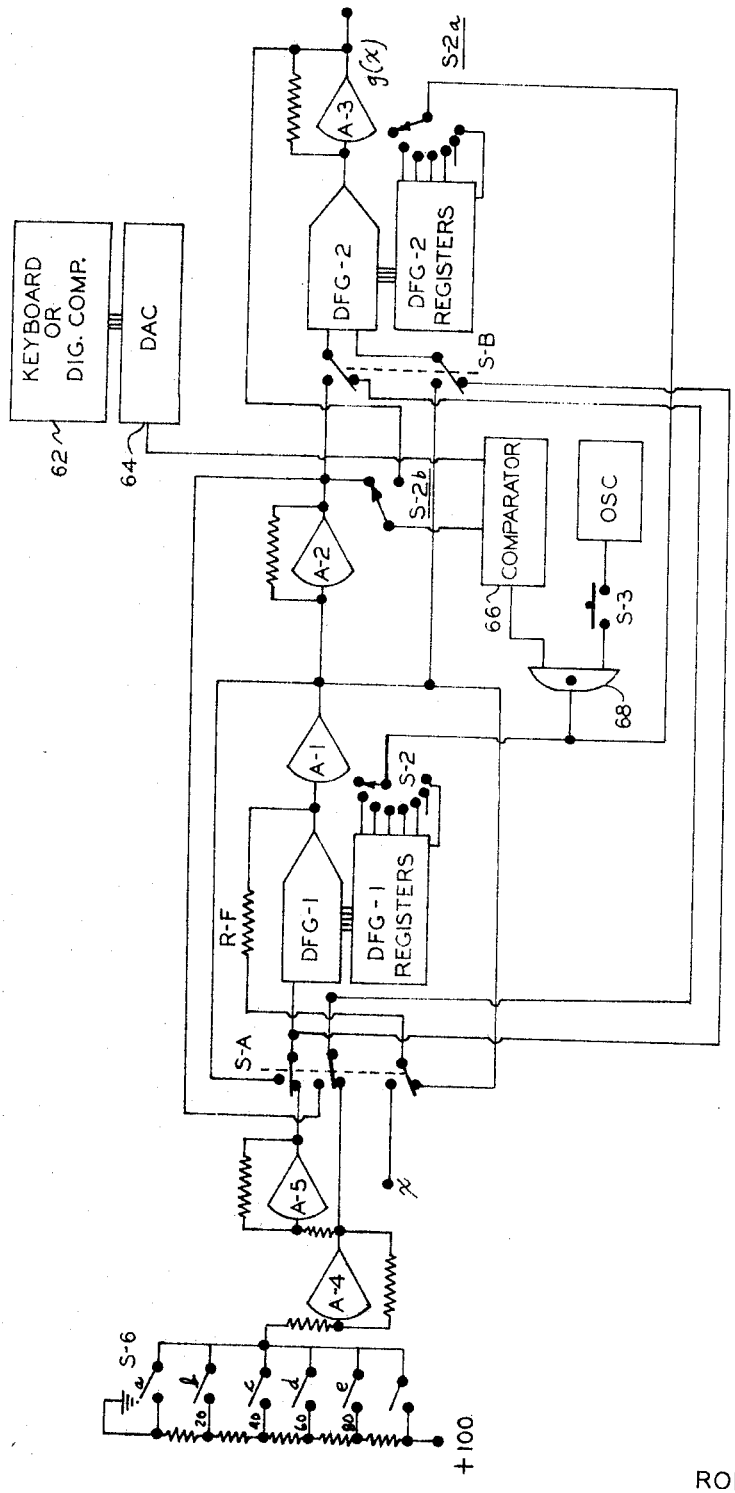
FIG. 6 is an electrical schematic diagram useful in illustrating how two function generators which are themselves adjustable only at predeterminedly-spaced breakpoint values may be set up and operated to synthesize a function at a plurality of arbitrarily-spaced breakpoint values.

In FIG. 6 DFG–1 and DFG–2 each may comprise a function generator adapted to generate a function at a plurality of predetermined equally-spaced breakpoints. For purposes of explanation, assume that DFG–1 and DFG–2 both operate over a zero to 100-volt range with breakpoints fixed at 0, 20, 40, 60, 80, and 100 volts. DFG–1 is used in the feedback path of amplifier A1 to generate the function $\bar{x}$ which transforms unequally and arbitrarily spaced breakpoints in $x$ into equally-spaced breakpoints in $\bar{x}$. Then plus and minus $\bar{x}$ signals are applied as the input to similar DFG–2, which generates the desired function $g(x)$. In order to set up DFG–1, switch S–A in FIG. 6 is placed in the position shown, to connect a pair of test inputs from amplifiers A4 and A5 to DFG–1, and to connect resistor R–F as a feedback resistor around amplifier A1. With switch S–6a closed to apply a zero-voltage value from amplifiers A4 and A5, the parallax generator register of DFG–1 is first adjusted until the amplifier A1 output equals the desired value $x_0$ (zero in the example) of the zeroth $\bar{x}$ breakpoint. Switch S–B then may be closed to the position shown to provide zero volts to DFG–2, and the parallax register of DFG–2 then may be adjusted to provide the value of the function $g(x)$ at the zero value of the $x$ variable (which value is shown as 10 in FIG. 6a). Then switch S–6b is instead closed to apply a voltage (20 volts) corresponding to the first equally-spaced breakpoints $\bar{x}_1$, the central-slope register of DFG–1 is adjusted until the amplifier A1 output equals the first unequally-spaced breakpoint value $x_1$ (10 volts in the example), and the central-slope register of DFG–2 is adjusted to provide as an output from amplifier A3 the value (80) of $g(x)$ at the second unequally-spiced breakpoint. Next, switch S–6c is instead closed to apply a 40-volt voltage corresponding to the second equally-spaced breakpoint value $\bar{x}_2$, the first segment generator register of DFG–1 is then adjusted until the amplifier A–1 output equals the $x_2$ unequally-spaced breakpoint value (20 volts in the example of FIG. 6a), and the first segment generator register of DFG–2 is adjusted to provide an A3 amplifier output corresponding to the value (40) of $g(x)$ at the $x_3$ unequally-spaced breakpoint. The other blades of switch S–6 are successively closed one at a time to apply plus and minus input voltages of 60, 80 and 100 volts to DFG–1 and DFG–2, and the further segment generator registers of DFG–1 and DFG–2 are successively adjusted to provide output voltages of 30, 90 and 95 volts, respectively, from amplifier A2, and $g(x)$ values of 40, 80 and 20, respectively from amplifier A3. Each of the registers may be adjusted by gating pulses through AND gate 68, using the comparator 66 and oscillator to enter a keyboard or digital computer value in the manner described in connection with FIG. 1. Switch S–2b is used to sense the amplifier A2 output when a DFG–1 register is being adjusted, and to sense the A3 amplifier output when a DFG–2 register is being adjusted.

Next, switch S–A is transferred, thereby connecting DFG–1 in the feedback paths of amplifiers A1 and A2, and thereby connecting the input line to amplifier A1 via resistor R–F, and switch S–B is transferred, thereby connecting DFG–2 to be driven by the outputs of amplifiers A1 and A2. With DFG–1 having been set up to provide the unequally-spaced $x$ breakpoint value voltages from equally-spaced $\bar{x}$ value voltages when connected in the forward path of amplifier A1, it may be deduced and can be proven that by then connecting DFG–1 in the feedback path of amplifier A1, that amplifier A1 then will provide the equally-spaced $\bar{x}$ breakpoint value voltages as the unequally-spaced $x$ input breakpoint values are applied as inputs to amplifier A1. Thus it may be seen that a function having an arbitrary breakpoint spacing may be generated by two function generators having a predetermined, fixed breakpoint spacing, so that a single pair of reference voltage sources may be used, and so that no adjustable potentiometers and large number of amplifiers would be required as in the device of FIG. 3c. It also may be noted that the $\bar{x}$ output function provided from amplifiers A1 and A2 is the inverse of the function stored in DFG–1, so that the system of FIG. 6 allows an output function $g(x)$ to have extremely steep slopes, as this merely requires very small slopes in DFG–1, which are easily provided.

MULTI-VARIABLE FUNCTION GENERATION

The present invention is also applicable to the generation of functions of two or more variables. A function $f(x,y)$ of two variables may be represented by the following formula:

$$f(x,y) = f_0(x) + f_1(x)y + \sum_{i=2}^{M} f_i(x)h_i(y) \quad y > y_0 \quad (1)$$

$$= f_0(x) + f_1(x)y + \sum_{i=2}^{M} g_i(x)h_i(y) \quad y < y_0$$

Figure 7:
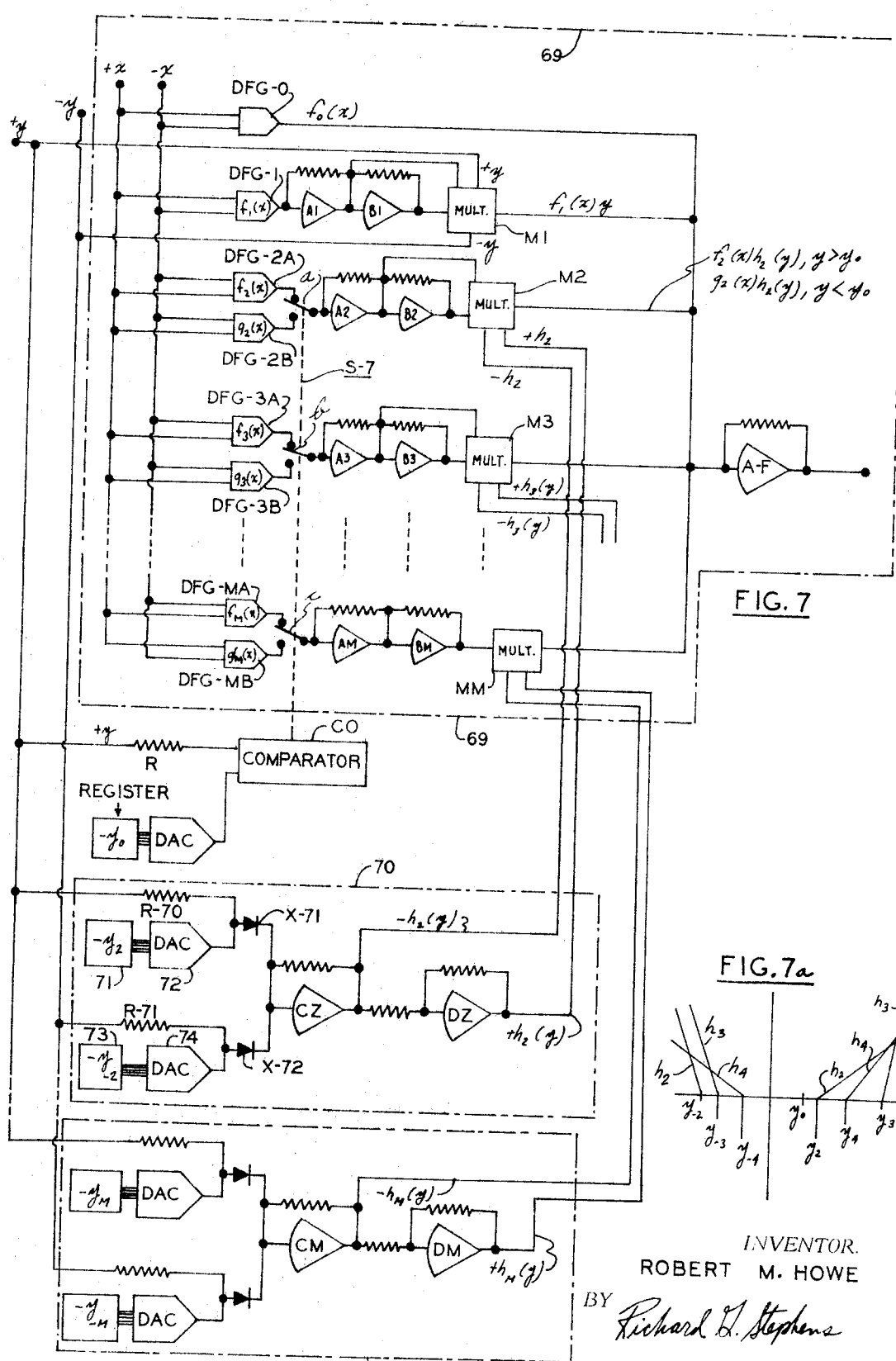

The above expression is shown implemented in accordance with the present invention in FIG. 7. The parallax function $f_0(x)$ is provided by means of DFG–0, which, like the other digital function generators shown in FIG. 7, preferably comprises a digitally-set function generator of one of the single-variable types disclosed above in connection with FIGS. 1–4a. Both polarities of the DFG–1 output $f_2(x)$ are applied via operational amplifiers A1 and B1 to electronic multiplier M1, thereby providing an $f_1(x)y$ input to amplifier A–F. DFG–2A and DFG–2B compute $f_2(x)$ and $g_2(x)$, respectively. Switch S–7a connects the output of DFG–2A to the amplifier A2 summing junction when the value of the $y$ input variable is greater than a selected value $y_0$, but instead connects the output of DFG–2B to amplifier A2 when $y$ is less than $y_0$. Comparator CO determines the polarity of $(y-y_0)$ and actuates the switches shown at S–7. Both polarities of the selected $f_2(x)$ or the $g_2(x)$ function are applied from amplifieres A2 and B2 to a conventional four-quadrant diode quarter-squares multiplier M2, to be multiplied by an interpolating function $h_2(y)$. Interpolating function $h_2(y)$ is a two-sided interpolation function generated in accordance with the disclosure of my prior copending application Ser. No. 651,932 filed June 12, 1967, and sample two-sided interpolation functions are shown in FIG. 7a. When the value of $y$ exceeds the value of $y_2$ set in register 71, it will be seen that diode X–71 will be forward biased and will apply a current to amplifier C2 which increases with $y$ and is proportional to resistance R–70, thereby providing the right-hand portion of the $h_2$ function shown in FIG. 7a. Whenever $y$ is less than $y_2$, diode X–71 will be cut off. When, on the other hand, the value of $y$ becomes more negative than the value of $y-2$ set in register 73, it will be seen that diode X–72 will become forward biased, to apply a current to amplifier C2 to provide the left-hand side of interpolating function $h_2$ shown in FIG. 7a. Thus it will be seen that multiplier M2 computes the product $f_2(x)h_2(y)$ when the $y$ input is greater than $y_0$ and computes the product $g_2(x)h_2(y)$ when the $y$ input is less than $y_0$. The further products, such as $f_3(x)h_3(y)$ or $g_3(x)h_3(y)$ from multiplier M3, up to the last pair of products $f_M(x)h_M(y)$ or $g_M(x)h_M(y)$ from multiplier MM are implemented in similar fashion and all are applied to summing amplifier A–F, which produces the output voltage $-f(x,y)$ in accordance with Equation 1. A similar two-sided interpolating function generator is provided for each of the desired number of $h_i(y)$ terms of expression (1), only the first and the last of such circuits being shown in FIG. 7 at 70 and 75. Both polarities of the $h_2(y)$ interpolation function are connected as shown to electronic multiplier M2, and each of the further two-sided interpolation functions are applied similarly to a similar multiplier.

The means 70 and 75 shown in FIG. 7 for generating the two-sided interpolation functions are one simplified version of devices shown in my above-mentioned copending application, and various other means shown in that application may be substituted. Some of the other two-sided interpolation function generators shown therein are made more accurate, and less sensitive to diode rounding, by incorporation of the diodes X–71 and X–72 within the C2 amplifier loop. It should be noted that the breakpoints along the $y$ axis may utilize any arbitrary spacing, and need not even be in successive order, just so long as the two sides of any two-sided function lie on opposite sides of the $y_0$ value, as exemplified in FIG. 7a.

It is also important to note in connection with FIG. 7 that additional functions of the same two variables $x$ and $y$ can be generated by duplicating the apparatus shown within dashed lines at 69, but that the comparator CO circuitry and the interpolating function generators 70 to 75 need not be repeated for the further functions. It also will be apparent to those skilled in the art that a number of two-variable function generators constructed in accordance with FIG. 7 may be combined to generate a function of three variables, using cross-interpolating functions $r_i(z)$ and switches, amplifiers and multipliers in the manner shown in FIG. 7. It also will be apparent at this point that in applications where the value of the $y$ variable is limited to a range of values all equal to or greater than the $y_0$ value, that the $g_2(x)$ through $g_M(x)$ digital function generators and comparator CO may be dispensed with, each remaining $f$ digital function generator output then permanently connected, and each interpolating function generating circuit halved (by omission of register 73, DAC 74, resistor R–71 and diode X–72 in circuit 70, for example and similar deletions in the other interpolating function generating circuits, up to circuit 75), and multipliers M1 through MM also may provide multiplication through less than all four quadrants, of course, in certain applications.

In order to generate two-variable functions by implementing Equation 1 supra, it is necessary to compute a number of products $f_i(x)h_j(y)$ and $g_i(x)h_i(y)$. The need in FIG. 7 for amplifier A2, B2, A3, B3 ... AM, BM and the need in FIG. 7 for multipliers M2, M3 ... MM connected to the outputs of the digitally-set function generatrors DFG–2A, DFG–2B to DFG–MA, DFG–MB, can be eliminated by using the multiplying function generator circuit of FIG. 5a in lieu of the non-multiplying types described in FIGS. 1–4, to provide the arrangement shown in FIG. 8. The interpolating function generators 70 and 75 shown as simple blocks may take the form of the circuits shown within dashed lines at 70 and 75 in FIG. 7. It will be seen that additional multipliers 78–2 to 78–M and similar pairs of inverting amplifiers A2, B2 ... AM, BM are then required ahead of the diode function generators, thereby providing no net savings in equipment if a single function $f_1(x,y)$ is to be generated. However, if further functions of the same two variables $(x,y)$ need to be generated simultaneously, as is often the case, it will be seen that such additional functions may be generated with very little additional equipment. To generate a second function $f_2(x,y)$, only the equipment shown within dashed lines at 89 need be provided, and it will be seen to require only parallax and central-slope generator equipment 80' which may take the form of the apparatus shown within dashed lines at 80, and a plurality of M further multiplying function generators similar to MDFG–2A, MDFG–2B ... MDFG–MA, MDFG–MB, driven from terminals 81–88 as shown. And it will be apparent that further equipments like that shown at 89 may be similarly driven by the basic apparatus of FIG. 8 to provide third, fourth and further functions of the same two variables. It will be apparent that also in FIG. 8 approximately half of the apparatus of FIG. 8 similarly may be deleted in the case of those applications where only operation over a restricted range is necessary.

Figure 8:
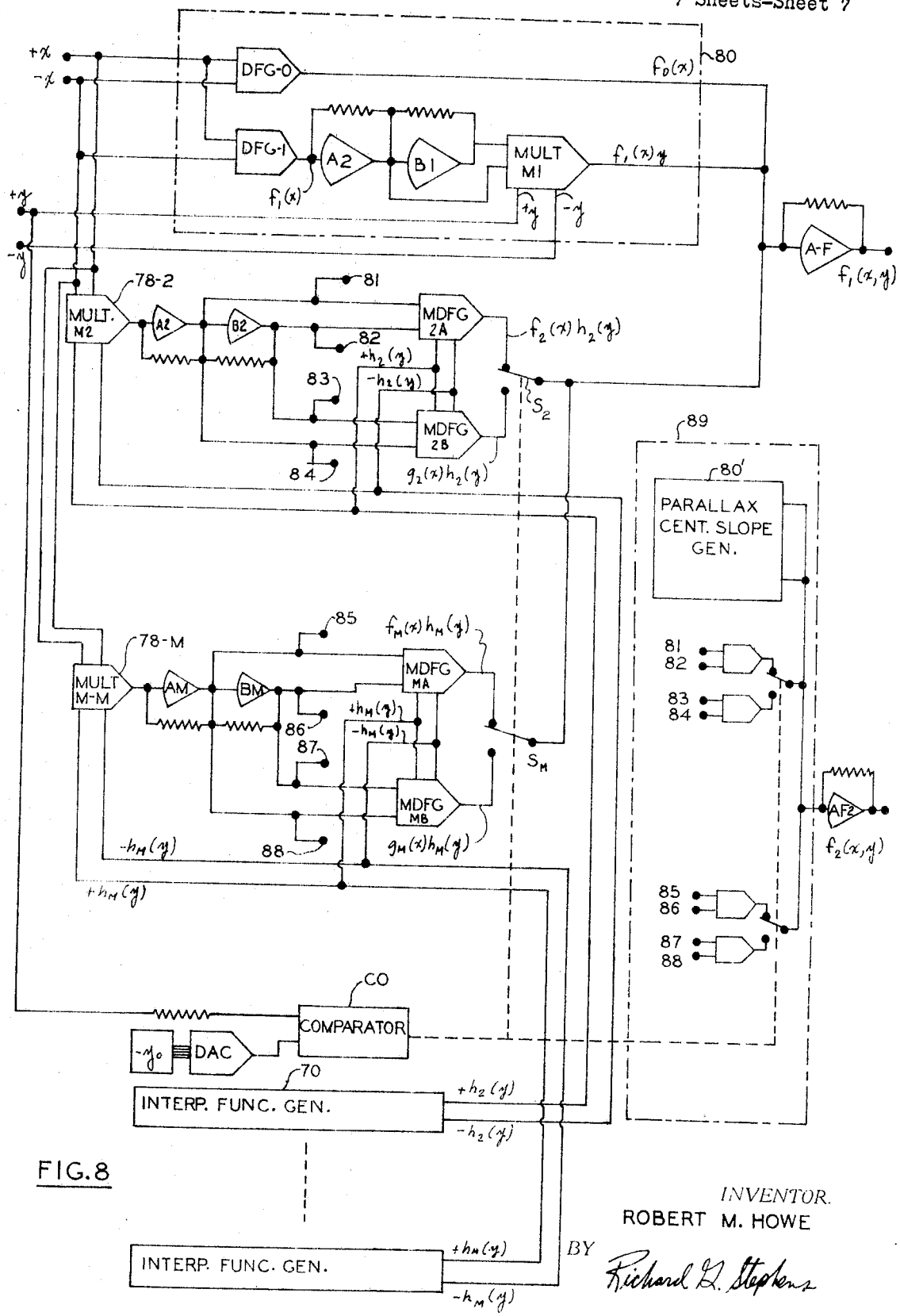
FIG. 8 is a schematic diagram illustrating another form of two-variable function generator constructed in accordance with the invention.

My abovementioned copending application also discloses the use of two or more comparators to generate two or more groups of two-sided interpolating functions, and it will be apparent that that technique may be applied to apparatus of either the type shown in FIG. 7 or the type shown in FIG. 8.

The registers used with various embodiments of the invention may take a variety of forms. Where the ability to set the registers directly from a pulse generator is considered unnecessary, punched card-controlled switches or similar digital storage means may be used. While the current-generators of each register-controlled segment generator have been illustrated as using pure binary weighting of the different currents, it will be apparent at this point that different codes, such as BCD, Gray and Excess Three, may be used instead in the registers and in the resistor scaling.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Electronic function generator apparatus for generating an output signal in accordance with a desired nonlinear function of an independent input variable, comprising, in combination: a plurality of multi-stage register means each adapted to store a respective digital signal commensurate with a respective slope increment of said desired function in accordance with a selected digital code in which successive bits have successive respective weights in accordance with a selected progression; means for providing a first input voltage commensurate with the instantaneous value of said independent input variable; means for providing a first reference voltage; a first plurality of current-generating means, each of said current-generating means being associated with a respective stage of said register means, connected to said first input voltage and to said first reference voltage, and controlled by the bit in its respective register stage for providing a respective weighted current when said first input voltage exceeds a specified percentage of said first reference voltage, each current-generating means associated with a given register means being operative to provide its respective weighted current at the same value of said input variable, the currents provided by the current-generating means associated with a given register means being weighted respectively in accordance with said selected progression of the digital code in said given register; and current-combining means for combining said weighted currents to provide said output signal.

2. Apparatus according to claim 1 in which at least one of said current-generating means comprises a first terminal, a first resistance connected between said first input voltage and said first terminal, a second resistance connected between said first reference voltage and said first terminal, first unidirectonal conducting means connected to said first terminal to provide said weighted current of said one current-generating means, and enabling means controlled by the stage of the register means associated with said one of said current-generating means for controlling the application of the weighted current of said one current-generating means to said current-combining means.

3. Apparatus according to claim 1 including means for providing a second input voltage commensurate with the instantaneous value of said input variable and opposite in sense to said first input voltage, means for providing a second reference voltage opposite in sense to said first reference voltage, and a second plurality of further current-generating means connected to said second input voltage and said second reference voltage to provide weighted currents which are opposite in sense to the weighted currents provided by said current-generating means of said first plurality.

4. Apparatus according to claim 1 in which a first of said current-generating means comprises a first terminal, a first resistance connected between said input voltage and said first terminal, a second resistance connected between said first reference voltage and said first terminal, and first unidirectional conducting means connected to said first terminal to provide said weighted current of said first of said current-generating means, and in which a second of said current-generating means comprises a third resistance and a second unidirectional conducting means connected between said first terminal and said current-combining means.

5. Apparatus according to claim 1 in which a first of said current-generating means comprises a first terminal, a first resistance connected between said first input voltage and said first terminal, a second resistance connected between said first reference voltage and said first terminal, and first unidirectional conducting means connected to said first terminal to provide said weighted current of said first of said current-generating means, and in which a second and third of said current-generating means comprise voltage divider means connected to be excited by the voltage at said first terminal, third and fourth resistances and second and third unidirectional conducting means, said third resistance and said second unidirectional conducting means being connected to series between said voltage divider and said current-combining means, and said fourth resistance and said third unidirectional conducting means being connected in series between said voltage divider and said current-combining means.

6. Apparatus according to claim 1 in which a first of said current-generating means comprises a first terminal, a first resistor connected between said input voltage and said first terminal, a second resistor connected between said first reference voltage and said first terminal, and a first unidirectional conducting means connected between said first terminal and said current-combining means, and in which a second of said current-generating means comprises a second terminal, a third resistor connected between said input voltage and said second terminal, a fourth resistor connected between said first reference voltage and said second terminal, and a second unidirectional conducting means connected between said second terminal and said current-combining means.

7. Apparatus according to claim 1 including a further register means, a plurality of resistances connected to said first input voltage to provide a further plurality of weighted currents, and switching means controlled by said further register means for selectively connecting various of said weighted currents through said further plurality of resistances to said current-combining means.

8. Apparatus according to claim 1 in which each of said multi-stage register means comprises a multi-stage pulse counter and in which said apparatus includes means for providing a plurality of voltages commensurate with the values of said desired function at a plurality of breakpoint values of said variable, comparator means for comparing each of said breakpoint-value voltages with said output voltage from said current-combining means, pulse-generating means, and gating means controlled by said comparator means for applying pulses to said pulse counters to provide output voltages from said current-combining means corresponding to the values of said desired function at said breakpoint values of said variable.

9. Apparatus according to claim 1 in which a first of said current-generating means comprises a first terminal, a first resistance connected between said input voltage and said first terminal, a second resistance connected between said reference voltage and said first terminal, a first unidirectional conducting means and a third resistance connected in series between said first terminal and a point of reference potential, and a fourth resistance connected from the junction between said unidirectional conducting means and said fourth resistance to said current-combining means to provide the weighted current from said first current-generating means.

10. Apparatus according to claim 2 in which said enabling means comprises a second unidirectional conducting means connected between said first terminal and said stage of said register means associated with said one of said current-generating means.

11. Apparatus according to claim 2 having a second forwardly-poled unidirectional conducting means and in which said second resistance is connected to said first reference voltage through said second forwardly-poled unidirectional conducting means, and a third resistance connected from the junction between said forwardly-poled unidirectionally conducting means to a source of reference potential, thereby to vary the magnitude of the voltage applied to said second resistance as the forward voltage drop across said forwardly-poled second unidirectional conducting means changes with temperature to tend to compensate for the variation in voltage drop with temperature of said first unidirectional conducting means.

12. Apparatus according to claim 5 having a forward-poled fourth unidirectional conducting means and in which said voltage divider means and said forward-poled fourth unidirectional conducting means are connected in series between said first terminal and a source of reference potential, and fifth resistance means connected from the junction between said voltage divider means and said fifth resistance means to a further source of reference potential.

13. Apparatus according to claim 6 in which the ratio between the resistances of said first and second resistors equals the ratio between said third and fourth resistors.

14. Electronic function generator apparatus for generating an output signal in accordance with a desired arbitrary function of first and second independent variables, comprising, in combination: means for providing a first input signal commensurate with the instantaneous value of said first independent variable; means for providing a second input signal commensurate with the instantaneous value of said second independent variable; a plurality of non-linear function generator circuits responsive to said first input signal and each operative to provide a respective output signal commensurate with a respective function of said first variable; a plurality of interpolating function generating circuits each responsive to said second input signal and each operative to provide a respective output signal commensurate with the amount by which said second input signal exceeds a respective breakpoint value of said second variable; a plurality of electronic multiplier circuits each connected to receive the output signals of a respective one of said non-linear function generator circuits and a respective one of said interpolating function generating circuits and to provide an output signal; and means connected to receive the output sigals of each of said electronic multiplier circuits, each of said non-linear function generator circuits comprising a plurality of multi-stage register means for storing respective digital signals commensurate with respective slope increments of a respective one of said functions of said first variable and a plurality of current-generating means, each of said current-generating means being controlled by a respective stage of one of said multi-stage register means to provide a respective weighted current, and each current-generating means associated with a given register means being operative to provide its respective weighted current at the same value of said first variable.

15. Electronic function generator apparatus for generating an output voltage in accordance with a desired non-linear function of an independent input variable, comprising, in combination: a plurality of multi-stage register means each adapted to store a respective digital signal commensurate with a respective slope increment of said desired function in accordance with a selected digital code in which successive bits have successive respective weights in accordance with a selected progression; means for providing a first input voltage commensurate with the instantaneous value of said independent input variable; means for providing a first plurality of reference voltages; a first plurality of current-generating means, each of said current-generating means being associated with a respective stage of said register means, connected to said first input voltage and to one of said reference voltages, and controlled by the bit in its respective register stage for providing a respective weighted current when said first input voltage exceeds a specified percentage of the reference voltage to which it is connected, each current-generating means associated with a given register means being connected to the same one of said reference voltages and operative to provide its respective weighted current at the same value of said input variable and the current-generating means associated with different ones of said register means being connected to different ones of said reference voltages of said first plurality to provide their respective weighted currents at different values of said independent input variable, the currents provided by the current-generating means associated with a given register means being weighted respectively in accordance with said selected progression of the digital code in said given register; and current-combining means for combing said weighted currents to provide said output voltage.

16. Apparatus according to claim 15 in which at least one of said current-generating means comprises a first terminal, a first resistance connected between said input voltage and said first terminal, a second resistance connected between one of said reference voltages and said first terminal, first unidirectional conducting means connected to said first terminal to provide said weighted current of said one current-generating means, and enabling means controlled by the stage of the register means associated with said one of said current-generating means for controlling the application of the weighted current of said one current-generating means to said current-combining means.

17. Apparatus according to claim 15 including means for providing a second input voltage commensurate with the instantaneous value of said input variable and opposite in sense to said first input voltage, means for providing a second plurality of reference voltages each opposite in sense to one of said reference voltages of said first plurality, and a second plurality of further current-generating means connected to said second input voltage and respective ones of said reference voltages of said second plurality to provide weighted currents which are opposite in sense to the weighted currents provided by said current-generating means of said first plurality.

18. Apparatus according to claim 15 in which a first of said current-generating means comprises a first terminal, a first resistance connected between said input voltage and said first terminal, a second resistance connected between one of said reference voltages and said first terminal, and first unidirectional conducting means connected to said first terminal to provide said weighted current of said first of said current-generating means, and in which a second of said current-generating means comprises a third resistance and a second unidirectional conducting means connected between said first terminal and said current-combining means.

19. Apparatus according to claim 15 in which a first of said current-generating means comprises a first terminal, a first resistance connected between said first input voltage and said first terminal, a second resistance connected between one of said reference voltages and said first terminal, and first unidirectional conducting means connected to said first terminal to provide said weighted current of said first of said current-generating means, and in which a second and third of said current-generating means comprise voltage divider means connected to be excited by the voltage at said first terminal, third and fourth resistances and second and third unidirectional conducting means, said third resistance and said second unidirectional conducting means being connected in series between said voltage divider and said current-combining means, and said fourth resistance and said third unidirectional conducting means being connected in series between said voltage divider and said current-combining means.

20. Apparatus according to claim 15 in which a first of said current-generating means comprises a first terminal, a first resistor connected between said input voltage and said first terminal, a second resistor connected between one of said reference voltages and said first terminal, and a first unidirectional conducting means connected between said first terminal and said current-combining means, and in which a second of said current-generating means comprises a second terminal, a third resistor connected between said input voltage and said second terminal, a fourth resistor connected between one of said reference voltages and said second terminal, and a second unidirectional conducting means connected between said second terminal and said current-combining means.

21. Apparatus according to claim 15 including a further register means, a plurality of resistances connected to said first input voltage to provide a further plurality of weighted currents, and switching means controlled by said further register means for selectively connecting various of said weighted currents through said further plurality of resistances to said current-combining means.

22. Apparatus according to claim 15 in which each of said multi-stage register means comprises a multi-stage pulse counter and in which said apparatus includes means for providing a plurality of voltages commensurate with the values of said desired function at a plurality of breakpoint values of said variable, comparator means for comparing each of said breakpoint-value voltages with said output voltage from said current-combining means, pulse-generating means, and gating means controlled by said comparator means for applying pulses to said pulse counters to provide output voltages from said current-combining means corresponding to the values of said desired function at said breakpoint values of said variable.

23. Apparatus according to claim 15 in which a first of said current-generating means comprises a first terminal, a first resistance connected between said input voltage and said first terminal, a second resistance connected between one of said reference voltages and said first terminal, a first unidirectional conducting means and a third resistance connected in series between said first terminal and a point of reference potential, and a fourth resistance connected from the junction between said unidirectional conducting means and said fourth resistance to said current-combining means to provide the weighted current from said first current-generating means.

24. Apparatus according to claim 16 in which said enabling means comprises a second unidirectional conducting means connected between said first terminal and said stage of said register means associated with said one of said current-generating means.

25. Apparatus according to claim 16 having a second forwardly-poled unidirectional conducting means and in which said second resistance is connected to one of said reference voltages through said second forwardly-poled unidirectional conducting means, and a third resistance connected from the junction between said second forwardly-poled unidirectionally conducting means to a source of reference potential, thereby to vary the magnitude of the voltage applied to said second resistance as the forward voltage drop across said forwardly-poled second unidirectional conducting means changes with temperature to tend to compensate for the variation in voltage drop with temperature of said first unidirectional conducting means.

26. Apparatus according to claim 19 having a forward-poled fourth unidirectional conducting means and in which said voltage divider means and said forward-poled fourth unidirectional conducting means are connected in series between said first terminal and a source of reference potential, and fifth resistance means connected from the junction between said voltage divider means and said fifth resistance means to a further source of reference potential.

27. Apparatus according to claim 20 in which the ratio between the resistances of said first and second resistors equals the ratio between the resistances of said third and fourth resistors.

28. Electronic function generating apparatus for generating an output signal in accordance with a desired arbitrary function of first and second independent variables, comprising, in combination: means for providing a first input signal commensurate with the instantaneous value of said first independent variable; means for providing a second input signal commensurate with the instantaneous value of said second indpendent variable; a plurality of interpolating function generating circuits each responsive to said second input signal and each operative to provide a respective output signal commensurate with the amount by which said second input signal exceeds a respective breakpoint value of said second variable; a plurality of electronic multiplier circuits each responsive to said first input signal and to the output signals from a respective one of said interpolating function generating circuits and operative to provide an output signal; and a plurality of multiplying function generator circuits each responsive to the output signal from a respective one of said multiplier circuits and to the output signal from a respective one of said interpolating function generating circuits and operative to provide an output signal; and means connected to receive the output signals of each of said multiplying function generator circuits, each of said multiplying function generator circuits comprising a plurality of multi-stage register means for storing respective digital signals commensurate with respective slope increments of a respective function of said first variable and a plurality of current-generating means, each of said current-generating means being excited by the output signal from one of said interpolating function generating circuits and controlled by a respective stage of one of said multi-stage register means to provide a respective weighter current, each current-generating means associated with a given register means being excited by the same interpolating function generating circuit output signal.

29. Electronic function generation apparatus for generating an arbitrary function of an input variable at arbitrarily desired breakpoint values utilizing function generator apparatus adjustable to generate arbitrary functions at predetermined breakpoint values, comprising, in combination: first and second function generators each having a plurality of means adjustable to vary the respective output signals of said function generators at said predetermined breakpoint values; means for applying a successive plurality of input signals corresponding to said predetermined breakpoint values to said first function generator; means for adjusting said first function generator to provide output signals from said first function generator commensurate with successive ones of said arbitrarily desired breakpoint values; means for applying a plurality of input signals corresponding to said predetermined breakpoint values successively to said second function generator; means for adjusting said second function generator to provide output signals from said second function generator commensurate with the values of said arbitrary function at successive of said arbitrarily desired breakpoint values; amplifier means having input and output circuits; first circuit means for applying an input signal commensurate with the value of said input variable to said input circuit of said amplifier means; second circuit means for connecting the output ciricut of said amplifier means to apply input signals to said first function generator and for connecting the output signal from said first function generator to said input circuit of said amplifier means; and third circuit means for connecting the output circuit of said amplifier means to said second function generator.

30. Apparatus according to claim 29 in which each of said function generators includes a plurality of segment generators connected to selectively apply currents to a respective output terminal, and in which each of said segment generators comprises a plurality of current-generating circuits and a respective register means connected to control the current applied to said output terminal.

31. The method of adjusting electronic function generator apparatus to generate an output potential in accordance with a desired arbitrary function of an independent input variable by approximating said function at a plurality of arbitrarily-spaced breakpoint values of said input variable, using function generator apparatus which are adjustable individually to approximate functions only at predeterminedly spaced breakpoint values of said input variable, comprising the steps of: applying a plurality of input signals in succession to a first function generator, each of said input signals being commensurate with a respective one of said predeterminedly-spaced breakpoint values of said input variable, and adjusting said first function generator to provide an output potential from said first function generator for each of said input signals commensurate with a respective one of said arbitrarily spaced breakpoint values of said input variable; applying said plurality of input signals in succession to a second function generator and adjusting said second function generator to provide an output potential for each of said input signals commensurate with a respective value of said desired function at a respective one of said arbitrarily-spaced breakpoint values of said input variable; connecting an input signal commensurate with said input variable and the output signal from said first function generator to be summed by an amplifier means; and connecting output signals from said amplifier means to drive said first and second function generators.

32. Multiplying function generator apparatus for providing an output potential commensurate with the product of a first variable and a desired function of a second variable comprising, in combination: a plurality of multistage register means each adapted to store a respective digital signal commensurate with a respective slope increment of said desired function in accordance with a selected digital code in which successive bits have successive weights in accordance with a selected progression; means for providing an input voltage commensurate with the instantaneous value of said second variable; electronic multiplier means responsive to said input voltage and to said further voltage for providing a product voltage commensurate with the product of said first and second variables; current-generating means associated with each stage of said register means, connected to said input voltage and to said product voltage and controlled by the bit in its respective stage for providing a respective weighted current when the input voltage applied to it exceeds a specified percentage of the product voltage applied to it, each current-generating means associated with a given register being scaled to provide its respective weighted current at the same value of said input variable, the currents provided by the current-generating means associated with a given register means being weighted respectively in accordance with said selected progression of the digital code in said given register; and current-combining means for combining said weighted currents to provide said output voltage.

33. Apparatus according to claim 28 having a further plurality of multiplying function generator circuits each responsive to the output signal from a respective one of said multiplier circuits and to the output signal from a respective one of said interpolating function generating circuits and operative to provide an output signal; and means for combining the output signals from said multiplying function generator circuits of said further plurality to provide an output signal commensurate with a second arbitrary function of said first and second independent variables.

References Cited

UNITED STATES PATENTS

| | | | |
|---|---|---|---|
| 2,933,254 | 4/1960 | Goldberg et al. | 235—197 |
| 3,065,423 | 11/1962 | Peterson | 235—150.52 |
| 3,080,555 | 3/1963 | Vadus et al. | 235—197 X |
| 3,119,928 | 1/1964 | Skramstad | 235—150 |
| 3,373,293 | 3/1968 | Hansen et al. | 307—229 |

MALCOLM A. MORRISON, Primary Examiner

R. W. WEIG, Assistant Examiner

U.S. Cl. X.R.

235—197, 150.52